(12) United States Patent
Gosling et al.

(10) Patent No.: US 10,260,015 B2
(45) Date of Patent: Apr. 16, 2019

(54) FUEL COMPOSITION FOR GCI ENGINES AND METHOD OF PRODUCTION

(71) Applicants: UOP LLC, Des Plaines, IL (US); Saudi Arabian Oil Company, Dhahran (SA)

(72) Inventors: Christopher D. Gosling, Roselle, IL (US); Mary Jo Wier, Schaumburg, IL (US); Gautam T. Kalghatgi, Dhahran (SA)

(73) Assignees: UOP LLC, Des Plaines, IL (US); Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/872,796

(22) Filed: Jan. 16, 2018

(65) Prior Publication Data

US 2018/0142172 A1 May 24, 2018

Related U.S. Application Data

(63) Continuation of application No. PCT/US2016/041755, filed on Jul. 11, 2016.

(Continued)

(51) Int. Cl.

| | |
|---|---|
| *C10L 1/04* | (2006.01) |
| *C10G 65/00* | (2006.01) |
| *C10G 59/00* | (2006.01) |
| *C10G 63/00* | (2006.01) |
| *C10G 69/00* | (2006.01) |

(52) U.S. Cl.
CPC ............... *C10L 1/04* (2013.01); *C10G 59/00* (2013.01); *C10G 63/00* (2013.01); *C10G 65/00* (2013.01); *C10G 69/00* (2013.01); *C10G 2300/301* (2013.01); *C10G 2300/305* (2013.01);

(Continued)

(58) Field of Classification Search
CPC ........... C10L 1/04; C10G 65/00; C10G 59/00; C10G 63/00; C10G 69/00
See application file for complete search history.

(56) References Cited

U.S. PATENT DOCUMENTS 2,749,225 A 6/1956 Barnum et al.
4,398,505 A * 8/1983 Cahill ..................... C10L 1/232
123/1 A (Continued)

FOREIGN PATENT DOCUMENTS

| EP | 1230326 | 6/2006 |
|---|---|---|
| GB | 735134 | 8/1995 |

(Continued)

OTHER PUBLICATIONS

International Search Report for PCT/US2016/041755.

(Continued)

*Primary Examiner* — Brian A McCaig

(57) ABSTRACT

GCI fuel compositions and methods of making them are described. The GCI fuel compositions comprises a fuel blend having an initial boiling point in a range of about 26° C. to about 38° C. and a final boiling point in a range of about 193° C. to less than 250° C., a density of about 0.72 kg/l to about 0.8 kg/l at 15° C., a research octane number of about 70 to about 85, and a cetane number of less than about 27, the fuel blend comprising a naphtha stream and a kerosene stream.

22 Claims, 1 Drawing Sheet

Related U.S. Application Data

(60) Provisional application No. 62/194,631, filed on Jul. 20, 2015.

(52) U.S. Cl.
CPC . *C10G 2300/307* (2013.01); *C10G 2300/308* (2013.01); *Y02P 30/48* (2015.11)

(56) References Cited

U.S. PATENT DOCUMENTS

| | | | | |
|---|---|---|---|---|
| 4,738,686 | A | * | 4/1988 | Dillon .................. C10L 1/1855 44/349 |
| 8,038,742 | B2 | | 10/2011 | Shibata |
| 8,669,402 | B2 | | 3/2014 | Bessonette et al. |
| 2009/0071871 | A1 | * | 3/2009 | Joensen .................. C10G 3/49 208/66 |
| 2009/0178951 | A1 | | 7/2009 | Balthasar et al. |
| 2013/0315009 | A1 | | 11/2013 | Kim |

FOREIGN PATENT DOCUMENTS

| | | |
|---|---|---|
| JP | 2007291310 A | 8/2007 |
| JP | 2009167405 | 7/2009 |
| JP | 5319128 | 8/2009 |
| WO | 01/32811 | 5/2001 |
| WO | 2014133012 A1 | 9/2014 |

OTHER PUBLICATIONS

Written Opinion of the International Searching Authority for PCT/US2016/041755, dated Nov. 24, 2016.
Supplemental European Search Report for corresponding European Patent Application dated Jan. 2, 2019.

* cited by examiner

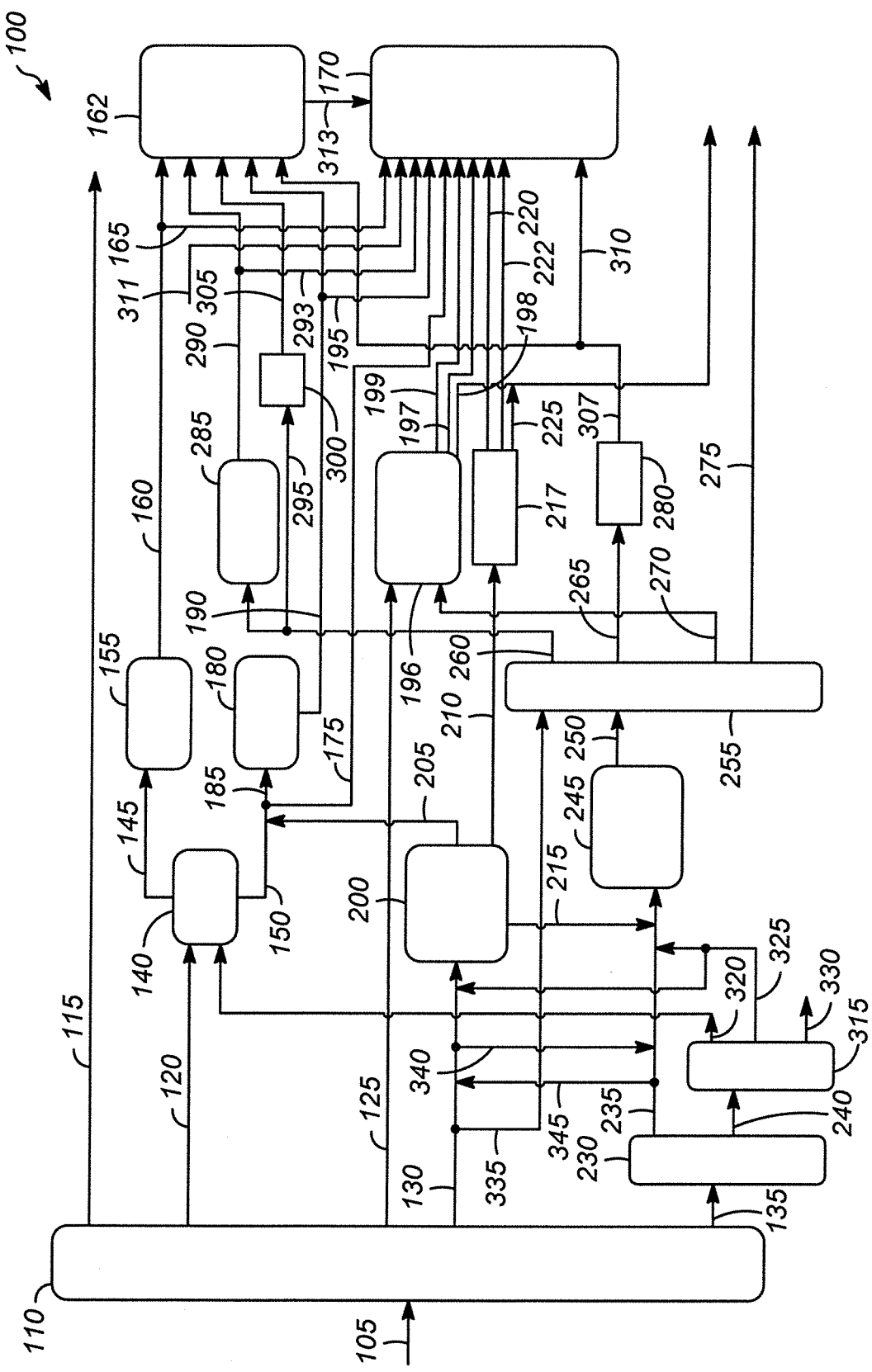

FUEL COMPOSITION FOR GCI ENGINES AND METHOD OF PRODUCTION

This application is a continuation of co-pending International Application No. PCT/US16/41755, entitled FUEL COMPOSITION FOR GCI ENGINES AND METHOD OF PRODUCTION, filed Jul. 11, 2016, which claims the benefit of U.S. Provisional Application Ser. No. 62/194,631, entitled FUEL COMPOSITION AND METHOD OF MAKING, filed Jul. 20, 2015, each of which is incorporated herein by reference.

BACKGROUND OF THE INVENTION

Global transport will continue to be powered largely by petroleum-based liquid fuels in the next few decades. The increase in demand for transportation fuel will be mostly in the commercial transport sector (heavy duty road, air, marine and rail), and much more diesel and jet fuel will be needed in the future compared to gasoline. Moreover, gasoline octane quality needs to increase to enable more efficient spark ignition engines. This poses significant challenges to the refining industry and is likely to increase the availability of low octane components in the gasoline boiling range.

One approach to mitigate the imbalance in demand growth between gasoline and middle distillates is to change the demand requirements of future engines. There is little prospect of moving aviation from using conventional jet fuel to any significant degree, but some compression ignition (CI) engines could move from conventional diesel to natural gas (NG), particularly in markets such as the U.S. where the shale gas revolution has brought in an era of cheap and abundant gas.

Development trends in internal combustion (IC) engines are likely to have a significant impact on the properties required of future fuels. Moreover, there are very good opportunities to develop new engine/fuel systems which can be beneficial from the fuel and engine side as well as help to mitigate the demand imbalance. For instance, CI engines running on low octane (research octane number (RON) of about 70) gasoline and with more relaxed volatility requirements compared to current gasoline could be at least as efficient as current diesel engines but cheaper. This concept is known as Gasoline Compression Ignition (GCI).

Today's IC engines are either spark ignition (SI) engines running on gasoline or CI engines running on diesel fuel. In SI engines, gasoline is premixed with air, and the mixture is compressed. Heat release occurs in an expanding turbulent flame initiated by a spark near the top of the compression stroke, top dead center (TDC). In a diesel engine, air is compressed, and fuel is injected near TDC. Combustion is initiated by autoignition as the fuel vaporizes, mixes, and reacts with oxygen in the engine cylinder.

Currently, the passenger car sector is dominated by SI engines, whereas the commercial sector (heavy duty road, air, rail and marine) is dominated by CI engines.

SI engines are run at a stoichiometric fuel and air mixture that enables a three-way catalyst to be used to treat the exhaust and reduce tail-pipe emissions of unburned hydrocarbons (HC), carbon monoxide (CO) and NOx to extremely low levels.

CI engines are more efficient than SI engines, but suffer from high engine-out emissions of particulates and NOx (nitrogen oxides) which are very difficult to control by after-treatment of the oxygen-rich exhaust with catalysts. Particulates are formed in diesel engines because diesel fuel with a Cetane Number (CN) greater than about 40 autoignites too easily, before it has had a chance to mix adequately with oxygen. Exhaust gas recirculation (EGR) can be used to control NOx, but it reduces in-cylinder particulate oxidation and leads to increased engine-out particulate emissions. Hence, it is very difficult to control particulates and NOx simultaneously in diesel engines.

Engine manufacturers are currently trying to solve this problem by using very expensive technology such as very high injection pressures and complex after-treatment systems to control NOx and particulates. Some of these technologies compromise fuel efficiency.

Controlling particulates and nitrogen oxides (NOx) at reasonable cost without compromising efficiency would be much easier to meet if diesel engines were run on fuels which do not ignite as easily as diesel fuel, allowing more time for fuel and air to mix before combustion starts.

Gasoline Compression Ignition (GCI) engines are currently under development that can achieve substantially higher combustion efficiency than conventional diesel and gasoline spark ignition engines. These new GCI engines are similar in operation to Homogeneous Charge Compression Ignition (HCCI) engines, but have the fuel injection just prior to TDC on the compression stroke. These new engines can utilize different fuel compositions than conventional internal combustion engines. GCI engines may be at least as efficient as CI engines, and more efficient than the most advanced SI engines. They may also be less expensive than advanced CI engines.

There is a need for a fuel which has acceptable particulate and NOx emissions and which can be used in GCI engines, and for methods of making the fuel.

SUMMARY OF THE INVENTION

One aspect of the invention is a GCI fuel composition. In one embodiment, the GCI fuel composition comprises a fuel blend having an initial boiling point in a range of about 26° C. to about 38° C. and a final boiling point in a range of about 193° C. to less than 250° C., a density of about 0.72 kg/l to about 0.8 kg/l at 15° C., a research octane number of about 70 to about 85, and a cetane number of less than about 27, the fuel blend comprising a naphtha stream and a kerosene stream.

Another aspect of the invention is method of making a GCI fuel composition. In one embodiment, the method includes blending a naphtha stream and a kerosene stream to form a fuel blend having an initial boiling point in a range of about 26° C. to about 38° C. and a final boiling point in a range of about 193° C. to less than 250° C., a density of about 0.72 kg/l to about 0.8 kg/l at 15° C., a research octane number of about 70 to about 85, and a cetane number of less than about 27.

BRIEF DESCRIPTION OF THE DRAWING

The FIGURE is an illustration of one embodiment of a refining process according the present invention.

DETAILED DESCRIPTION OF THE INVENTION

A new low octane fuel composition has been identified for use in GCI engines, as well as a refinery process to produce the new fuel composition. The GCI fuel composition has a wide boiling range from light naphtha to kerosene, a low RON, and a low CN, while meeting all other gasoline specifications for olefins, aromatics, and sulfur. The GCI fuel composition is injected earlier in the engine cycle compared to normal diesel fuel. Particulates and NOx can be far more easily controlled by using fuels with high ignition delay. The final boiling point (FBP) of the GCI fuel composition is higher than that of conventional gasoline, which provides more time for the fuel to mix with oxygen before combustion starts so that particulate formation can be minimized. This makes it easier to control NOx using EGR. Also, the injection pressure does not need to be as high as it is for CI engines (e.g., about 40-50 MPa); rather, it can be closer to the pressure of turbo-charged SI engines (e.g., about 15 MPa). Consequently, the after-treatment focus can be on the oxidation of hydrocarbons (HC) and CO rather than control of NOx and particulates. The efficiency if the GCI engine is at least as high as with conventional diesel combustion.

The GCI fuel composition comprises a fuel blend having an initial boiling point in a range of about 26° C. to about 38° C. and a final boiling point of about 193° C. to less than 250° C., a density of about 0.72 kg/l to about 0.8 kg/l at 15° C., a RON of about 70 to about 85, and a CN of less than about 27. Desirably, the olefin content is less than about 18 lv % (liquid volume %), and the aromatic content is less than about 35 lv %. Desirably, the fuel composition has a sulfur content of less than about 50 wt ppm, or less than about 10 wt ppm, and a benzene content of less than about 1 lv %. The cetane number is generally at least about 5 or at least about 10. The GCI fuel composition can be made by blending a naphtha stream and a kerosene stream to have a fuel blend having the specified properties.

The final boiling point can be in a range of about 193° C. to less than 250° C., or about 193° C. to less than 245° C., or about 193° C. to less than 240° C., or about 193° C. to less than 235° C., or about 193° C. to less than 230° C., or about 193° C. to less than 225° C., or about 193° C. to less than 220° C., or about 193° C. to less than 215° C.

A unique specification of the new GCI fuel composition is the end point limitation of less than 250° C., coupled with a cetane number less than 27. Directionally, as the hydrocarbon chain length increases (higher end point), the autoignition temperature for a hydrocarbon/air mixture decreases, autoigniting quicker. NOx and particulates are formed when fuel autoignites before mixing adequately with oxygen.

The lower end point of new GCI fuel composition, less than 250° C., limits the amount of diesel (longer hydrocarbon chain) into the new GCI fuel composition. Jet and kerosene streams have lower cetane values than diesel; i.e., about 40 vs. higher cetane numbers for diesel. (The EU-V diesel specification for cetane number is at least 51). The higher the cetane number, the easier it is for the fuel to autoignite. Consequently, the end point limitation will limit the hydrocarbon chain length, minimizing the formation of NOx and particulates due to limiting autoignition, resulting in a cleaner fuel with reduced emissions.

The new GCI fuel composition can be produced in a conventional refinery with modifications. One unique characteristic of the process is that, in some embodiments, the heavy naphtha can bypass the reforming unit and be blended with light naphtha and a kerosene fraction that only needs to be hydrotreated to reduce sulfur content. This reduces the refinery operating cost to produce the fuel and increases the produced fuel volume by avoiding volume loss across the reforming unit.

The naphtha stream can comprise one or more of a hydrotreated straight run naphtha stream; an isomerate stream; a butane stream; a reformate stream; a gasoline stream; a hydrotreated FCC naphtha stream; and an alkylate stream.

The kerosene stream can be hydrotreated straight run kerosene or hydrotreated kerosene made from FCC cycle oil. The kerosene stream can include jet fuel, either straight run jet fuel or jet fuel made from FCC cycle oil.

One advantage of the new GCI fuel composition is that lower value streams, such as $nC_4$ (RONC about 94), light naphtha ($C_5$-$C_6$, RONC about 65), and isomerate ($C_5$/$C_6$, RONC about 80-90), can be used in the composition. This allows other high RONC gasoline blending streams, e.g., 2-methylpropane ($iC_4$, RONC about 105), reformate (RONC about 90-104), alkylate (RONC about 94-96), and/or methyl-tert-butyl ether (MTBE, RONC about 117) to be used for the higher RONC gasoline blends.

Isomerate is a gasoline blend stock, but the amount allowed in gasoline is limited due to distillation and Reed vapor pressure (RVP) constraints to a maximum of about 50 lv %. However, the new GCI fuel composition allows for higher amounts, e.g., up to about 80 lv %.

MTBE and alkylate are very valuable blend stocks for gasoline. They are not required for the GCI fuel composition, although they can be used if desired. The amount of MTBE being produced in a refinery is typically limited by the amount of iC4 olefins from the FCC (Fluid Catalytic Cracking) and Coker units. The MTBE produced is typically consumed by the refiner for the higher gasoline blends. Alkylate is also another key blend stock which will not be required for the GCI fuel composition. Alkylate is a desired blend stock due to its properties: no aromatics, no benzene, and low RVP with high RONC. As gasoline trends toward higher RONC, alkylate and MTBE will be required for the higher RONC blends, making them more valuable blend stocks. This reduces the desirability of using them in the GCI fuel composition.

One limiting specification for the GCI fuel composition is the specific gravity. However, since the upper limit of the final boiling point can be higher than for gasoline, kerosene can be blended to increase the specific gravity and energy content.

Thus, the GCI fuel composition provides the refiner significant product blending flexibility and a value added disposition for low value streams.

The naphtha stream has an initial boiling point range of about 0° C. to about 104° C. and a final boiling point range of about 146° C. to about 226° C.

In some embodiments, the naphtha stream contains hydrotreated straight run naphtha, including light naphtha and/or heavy naphtha, having an initial boiling point range of about 0° C. to about 104° C. and a final boiling point range of about 146° C. to about 204° C. The hydrotreated straight run naphtha stream typically has a sulfur content of less than about 50 wt ppm, or less than about 10 wt ppm.

The hydrotreated straight run light naphtha stream typically has an initial boiling point range of about 0° C. to about 35° C. and a final boiling point range of about 74° C. to about 104° C. The hydrotreated straight run heavy naphtha stream typically has an initial boiling point range of about 74° C. to about 104° C. and a final boiling point range of about 146° C. to about 204° C.

The isomerate stream typically has an initial boiling point range of about 27° C. to about 32° C. and a final boiling point range of about 79° C. about 107° C.

The butane stream typically has an initial boiling point of about −12° C. and a final boiling point of about −1° C.

The reformate stream typically has an initial boiling point range of about 27° C. to about 32° C. and a final boiling point range of about 182° C. to about 222° C.

The gasoline stream typically has an initial boiling point range of about 32° C. to about 49° C. and a final boiling point range of about 182° C. to about 216° C.

The hydrotreated FCC naphtha stream typically has an initial boiling point range of about 32° C. to about 49° C. and a final boiling point range of about 82° C. to about 216° C. The hydrotreated FCC naphtha stream typically has a sulfur content of less than about 50 wt ppm, or less than about 10 wt ppm.

The alkylate stream typically has an initial boiling point range of about 32° C. to about 49° C. and a final boiling point range of about 171° C. to about 188° C.

The kerosene stream typically has an initial boiling point range of about 146° C. to about 166° C. and a final boiling point range of about 249° C. to about 271° C. In some embodiments, the kerosene stream can include jet fuel. The hydrotreated kerosene stream typically has a sulfur content of less than about 50 wt ppm, or less than about 10 wt ppm.

The jet fuel stream typically has an initial boiling point range of about 149° C. to about 166° C. and a final boiling point range of about 243° C. to about 252° C. The hydrotreated jet fuel stream typically has a sulfur content of less than about 50 wt ppm, or less than about 10 wt ppm.

The hydrotreated straight run naphtha stream is typically present in an amount of about 0 to about 30 lv %, or about 0 lv % to about 25 lv %, or about 0 lv % to about 20 lv %, or about 5 lv % to about 30 lv %, or about 10 lv % to about 30 lv %. The isomerate stream is typically present in an amount of about 0 lv % to about 80 lv %, or about 0 lv % to about 75 lv %, or about 0 lv % to about 70 lv %, or about 0 lv % to about 65 lv %, or about 5 lv % to about 80 lv %, or about 10 lv % to about 80 lv %, or about 20 lv % to about 80 lv %, or about 30 lv % to about 80 lv %, or about 40 lv % to about 80 lv %, or about 50 lv % to about 80 lv % or about 5 lv % to about 65 lv %, or about 10 lv % to about 65 lv %, or about 20 lv % to about 65 lv %, or about 30 lv % to about 65 lv %, or about 40 lv % to about 65 lv %, or about 50 lv % to about 65 lv %. The butane stream is typically present in an amount of about 0 lv % to about 10 lv %. The reformate stream is typically present in an amount of about 0 lv % to about 50 lv %, or about 0 lv % to about 40 lv %, or about 0 lv % to about 30 lv %, or about 0 lv % to about 20 lv %, about 0 lv % to about 15 lv %. The gasoline stream is typically present in an amount of about 0 lv % to about 50 lv %, or about 0 lv % to about 40 lv %, or about 0 lv % to about 30 lv %, or about 0 lv % to about 20 lv %, or about 0 lv % to about 10 lv %, or about 10 lv % to about 50 lv %, or about 20 lv % to about 50 lv %, or about 30 lv % to about 50 lv %, or about 40 lv % to about 50 lv %. The hydrotreated FCC naphtha stream is typically present in an amount of about 0 lv % to about 40 lv %, or about 0 lv % to about 35 lv %, or about 0 lv % to about 30 lv %, or about 0 lv % to about 25 lv %, or about 0 lv % to about 20 lv %. The alkylate stream is typically present in an amount of about 0 lv % to about 35 lv %, or about 0 lv % to about 30 lv %, or about 0 lv % to about 25 lv %.

The kerosene stream (straight run and/or made by hydrocracking) is typically present in an amount of about 0 lv % to about 50 lv %, or about 0 lv % to about 45 lv %, or about 0 lv % to about 40 lv %, or about 0 lv % to about 35 lv %, or about 0 lv % to about 30 lv %, or about 0 lv % to about 25 lv %, or about 5 lv % to about 50 lv %, or about 10 lv % to about 50 lv %, or about 15 lv % to about 50 lv %, or about 20 lv % to about 50 lv %. The jet fuel stream (straight run and/or made by hydrocracking) is typically present in an amount of about 0 lv % to about 40 lv %, or about 0 lv % to about 35 lv %, or about 0 lv % to about 30 lv %, or about 0 lv % to about 25 lv %. The hydrotreated kerosene and/or jet fuel streams typically have a sulfur content of less than about 50 wt ppm, or less than about 10 wt ppm.

In some embodiments, the GCI fuel composition includes about 0 lv % to about 20 lv % hydrotreated heavy naphtha, about 50 lv % to about 70 lv % isomerate, about 0 lv % to about 10 lv % butanes, about 0 lv % to about 15 lv % reformate, about 0 lv % to about 20 lv % hydrotreated FCC naphtha, and about 0 lv % to about 35 lv % hydrotreated kerosene.

Shown below are only a few non-limiting examples of possible blends for the GCI fuel composition. The blends highlight the flexibility and the large ranges possible. The GCI fuel composition increases the refiners blending flexibility and profitability by using the lower value streams.

| Blend stock | Blend liq vol | A | B | C |
|---|---|---|---|---|
| Kerosene | lv % | 29.0% | 26.7% | 0.1% |
| Hydrotreated FCC Naphtha | lv % | 0.1% | 14.7% | 17.2% |
| Hydrotreated Straight Run Heavy Naphtha | lv % | 0.0% | 0.0% | 17.2% |
| Isomerate | lv % | 63.8% | 57.3% | 53.2% |
| nC$_4$ | lv % | 7.0% | 1.3% | 0.4% |
| Reformate | lv % | 0.0% | 0.0% | 11.8% |
| Total | lv % | 100.0% | 100.0% | 100.0% |

In some embodiments, the hydrotreated straight run heavy naphtha stream is formed by hydrotreating a straight run naphtha stream to form a hydrotreated straight run naphtha stream. In some embodiments, the hydrotreated straight run naphtha stream can be separated into a hydrotreated straight run light naphtha stream and a hydrotreated straight run heavy naphtha stream. The hydrotreated straight run light and heavy naphtha streams typically have a sulfur content of less than about 50 wt ppm, or less than about 10 wt ppm.

In some embodiments, the isomerate stream can be formed by isomerizing at least a portion of the hydrotreated straight run naphtha, e.g., the hydrotreated straight run light naphtha stream.

In some embodiments, the butanes stream can be formed by fractionating and treating (e.g., with an amine treatment) a hydrocarbon feed stream. Alternatively, the butanes stream can be formed as byproducts of various processes in the refinery, including, but not limited to, reforming, fluid catalytic cracking, coking, and hydrocracking. One or more of the byproduct streams from these processes can be combined, treated (e.g., with an amine treatment), and fractionated to form the butane stream.

In some embodiments, the reformate stream can be formed by reforming at least a portion of the hydrotreated straight run naphtha stream, e.g., the hydrotreated straight run heavy naphtha stream.

In some embodiments, the gasoline stream is formed by blending one or more of butanes, reformate, isomerate, FCC naphtha, and alkylate. The gasoline stream would meet the product specification for gasoline, e.g., the specifications for olefins, sulfur (e.g., less than about 50 wt ppm, or less than about 10 wt ppm), and aromatics.

In some embodiments, the hydrotreated FCC naphtha stream can be formed by fluid catalytically cracking at least one of an atmospheric gas oil stream, a vacuum gas oil stream, a coker gas oil stream, an unconverted oil stream, a light vacuum gas oil stream, or a hydrotreated gas oil stream to form an FCC stream. The FCC stream can be separated into a FCC naphtha stream (typically along with one or more other streams), which can then be hydrotreated. In some embodiments, the other streams can include a FCC cycle oil stream. In some embodiments, the FCC cycle oil stream can be hydrotreated and separated into a kerosene stream (including jet fuel or the jet fuel can be a separate stream, as desired) (typically along with one or more other streams).

In some embodiments, the alkylate stream can be formed by fluid catalytically cracking at least one of an atmospheric gas oil stream, a vacuum gas oil stream, a coker gas oil stream, an atmospheric gas oil stream, a heavy cycle oil stream, a light vacuum gas oil stream, or a hydrotreated gas oil stream to form an FCC stream. The FCC stream can be separated into a $C_3/C_4$ stream (typically along with one or more other streams). The $C_3/C_4$ stream includes $C_3$ and $C_4$ paraffins and olefins. In some embodiments, the $C_3/C_4$ stream can be separated into at least a $C_3$ olefin stream and a $C_4$ stream. Further separation can take place, if desired, such as separating the $C_4$ stream into a $C_4$ olefin stream and a $C_4$ paraffin stream, and/or separating the $iC_4$ olefins from the $C_4$ stream or the $C_4$ olefin stream. The $C_3$ olefins and/or all or a portion of the $C_4$ stream can be alkylated. All or a portion of the $iC_4$ olefin stream can be converted to methyl-tert-butyl ether (MTBE). Alternatively, a $C_4$ stream could be formed by separating a hydrocarbon feed stream into different fractions including a $C_4$ olefin stream and/or an $iC_4$ olefin stream.

In some embodiments, the kerosene stream can be formed by separating a hydrocarbon feed stream into a straight run kerosene stream (typically along with one or more other streams) and hydrotreating the straight run kerosene stream, or by separating a hydrocarbon feed stream into a straight run kerosene/diesel stream (typically along with one or more other streams), and hydrotreating and separating the straight run kerosene/diesel stream into a hydrotrotreated straight run kerosene stream (including jet fuel or the jet fuel can be a separate stream, as desired) (typically along with one or more other streams). The hydrotreated kerosene stream typically has a sulfur content of less than about 50 wt ppm, or less than about 10 wt ppm.

In some embodiments, the kerosene stream can be formed by at least one of: hydrocracking a first atmospheric gas oil stream, and separating the hydrocracked atmospheric gas oil stream into a first kerosene stream and at least one other stream; or hydrocracking a second atmospheric gas oil stream, separating the hydrocracked atmospheric gas oil stream into a kerosene/diesel stream and at least one other stream; and separating the kerosene/diesel stream into a second kerosene stream and at least one other stream. In some embodiments, the first and/or second kerosene streams can be optionally hydrotreated if desired. The hydrotreated kerosene stream typically has a sulfur content of less than about 50 wt ppm, or less than about 10 wt ppm.

In some embodiments, a jet fuel stream can be formed by separating a hydrocarbon feed into a straight run jet fuel stream (typically along with one or more other streams), and hydrotreating the straight run jet fuel stream; separating a hydrocarbon feed into a straight run jet/diesel stream (typically along with one or more other streams), and hydrotreating and separating the straight run jet/diesel stream into a hydrotreated jet fuel stream (typically along with one or more other streams); hydrocracking an atmospheric gas oil stream, and separating the hydrocracked atmospheric gas oil stream into a jet fuel stream (typically along with one or more other streams), or by hydrocracking an atmospheric gas oil stream, and separating the hydrocracked atmospheric gas oil stream into a kerosene/diesel stream (typically along with one or more other streams), and separating the kerosene/diesel stream into a jet fuel stream, (typically along with one or more other streams). In some embodiments, the jet fuel streams made by hydrocracking the atmospheric gas oil stream can be optionally hydrotreated if desired. The hydrotreated jet fuel stream(s) typically has a sulfur content of less than about 50 wt ppm, or less than about 10 wt ppm.

In some embodiments, as discussed above, rather than forming separate jet fuel and kerosene streams, a single stream containing kerosene and jet fuel can be formed.

In some embodiments, the hydrocracked atmospheric gas oil stream is separated into at least the jet fuel stream or the kerosene/diesel stream, a hydrocracker heavy naphtha stream, and an unconverted oil stream. In some embodiments, the hydrocracker heavy naphtha stream can be combined with the straight run naphtha stream.

In some embodiments, the atmospheric gas oil stream can be formed by separating a hydrocarbon feed stream into the atmospheric gas oil stream (typically along with one or more other streams).

In some embodiments, a hydrocarbon feed stream is separated into at least a straight run naphtha stream, a straight run kerosene/diesel stream, an atmospheric gas oil stream, and an atmospheric residue stream. The straight run naphtha stream can be hydrotreated to form a hydrotreated straight run naphtha stream. At least a portion of the hydrotreated straight run naphtha stream can be isomerized to form an isomerate stream. At least a portion of the hydrotreated straight run naphtha stream can be reformed to form the reformate stream. The straight run kerosene/diesel stream can be hydrotreated and separated into at least a hydrotreated straight run kerosene stream and at least one other stream. At least a portion of the atmospheric gas oil stream can be hydrocracked to form a hydrocracked stream. The hydrocracked stream can be separated to form at least a second kerosene/diesel stream, a hydrocracker naphtha stream, and an unconverted oil stream. The kerosene/diesel stream can be separated (and optionally hydrotreated) into at least a second kerosene stream and at least one other stream. The atmospheric residue stream can be vacuum separated to form a light vacuum gas oil stream and a vacuum gas oil stream. Optionally, at least a portion of one or more of the atmospheric gas oil stream, the light vacuum gas oil, or the unconverted oil stream can be partially hydrocracked. At least one of the atmospheric gas oil stream, the vacuum gas oil stream, a coker gas oil stream, the unconverted oil stream, the light vacuum gas oil stream, or a hydrotreated gas oil stream can be fluid catalytically cracked to form an FCC stream. The FCC stream can be separated into at least a $C_3/C_4$ stream, an FCC naphtha stream, and an FCC cycle oil stream (including light and/or heavy cycle oil). The FCC naphtha stream can be hydrotreated to form a hydrotreated FCC naphtha stream. The FCC cycle oil stream can be hydrotreated and separated into at least a third hydrotreated kerosene stream. The $C_3/C_4$ stream can be separated into at least a $C_3$ olefin stream and a $C_4$ stream. At least a portion of the $C_3$ olefin steam, the $C_4$ stream, or both can be alkylated to form an alkylate stream. The naphtha stream comprises at least one of: the straight run hydrotreated naphtha stream; the isomerate stream; the reformate stream; the hydrotreated FCC naphtha stream; the alkylate stream, a butane stream, and a gasoline stream. The straight run hydrotreated naphtha stream and the hydrotreated FCC naphtha stream typically have a sulfur content of less than about 50 wt ppm, or less than about 10 wt ppm. The kerosene stream comprises at least one of: the straight run hydrotreated kerosene stream; the second kerosene stream; and the third hydrotreated kerosene stream. The straight run hydrotreated kerosene stream and the third hydrotreated kerosene streams typically have a sulfur content of less than about 50 wt ppm, or less than about 10 wt ppm.

In some embodiments, the method can include at least one of: combining at least a portion of the atmospheric gas oil stream with the light vacuum gas oil stream; and combining the hydrocracker naphtha stream with the hydrotreated straight run naphtha stream.

In some embodiments, the vacuum gas oil stream can be coked to form a coked vacuum gas oil stream. The coked vacuum gas oil stream can be separated into at least a coker naphtha stream, a coker gas oil stream, and a coke stream. The method can include at least one of: combining the coker gas oil stream with the light vacuum gas oil stream, or the atmospheric gas oil stream, or both; and combining the coker naphtha stream with the straight run naphtha stream.

The FIGURE illustrates one embodiment of a process 100 for making the GCI fuel composition. A hydrocarbon feed stream 105 is fed to a crude distillation unit 110 where it is separated into multiple streams including e.g., liquefied petroleum gas (LPG) stream 115, straight run naphtha stream 120, straight run kerosene/diesel stream 125, atmospheric gas oil stream 130, and atmospheric residue stream 135.

The LPG stream 115 can be recovered and be sold or used as feed for a hydrogen plant, for example.

The straight run naphtha stream 120 can be sent to naphtha hydrotreating zone 140 where it is hydrotreated in the presence of hydrogen over a hydrotreating catalyst to remove heteroatoms, such as sulfur, nitrogen, and metals from the hydrocarbon feedstock, and to saturate hydrocarbons with double and triple bonds and aromatics. In some embodiments, the hydrotreated straight run naphtha may be separated into a hydrotreated straight run light naphtha stream 145 and a hydrotreated straight run heavy naphtha stream 150.

The hydrotreated straight run light naphtha stream 145 can be sent to isomerization zone 155 where the hydrotreated straight run light naphtha is isomerized over an isomerization catalyst to increase alkyl branching on the naphtha molecules. The isomerate stream 160 can be sent to a gasoline pool 162 for blending. At least a portion 165 of the isomerate stream 160 can be sent to the blending zone 170 for the GCI fuel composition.

At least a portion 175 of the hydrotreated straight run heavy naphtha stream 150 can bypass the catalytic reforming zone 180 and be sent to the blending zone 170.

At least a portion 185 of the hydrotreated straight run heavy naphtha stream 150 can be sent to the catalytic reforming zone 180 for reforming over reforming catalyst to increase the alkyl branching and aromaticization of the naphtha molecules. The reformate stream 190 can be sent to the gasoline pool 162. A portion 195 of the reformate stream 190 can be sent to the blending zone 170.

The straight run kerosene/diesel stream 125 can be hydrotreated over hydrotreating catalyst in the presence of hydrogen and separated in a hydrotreating and separation zone 196 into at least kerosene stream 197 and diesel stream 198, and optionally straight run jet fuel stream 199. Kerosene stream 197 and/or optional jet fuel stream 199 can be sent to the blending zone 170. Diesel stream 198 can be sent to the diesel pool (not shown). Alternatively, separate straight run kerosene, jet fuel, and diesel streams could be formed in the crude distillation unit 110.

The atmospheric gas oil stream 130 can be sent to a hydrocracking zone 200 for hydrocracking the atmospheric gas oil stream over a hydrocracking catalyst in the presence of hydrogen. The hydrocracked atmospheric gas oil is then separated into multiple streams including, e.g., a hydrocracker naphtha stream 205, a kerosene/diesel stream 210, and an unconverted oil stream 215.

The hydrocracker naphtha stream 205 can be combined with hydrotreated straight run heavy naphtha stream 150, if desired.

The kerosene/diesel stream 210 can be separated into jet fuel stream 220, kerosene stream 222, and diesel stream 225 in separation zone 217. Separation zone 217 can include optionally hydrotreating the jet fuel stream 220, kerosene stream 222, and diesel stream 225 in the presence of hydrogen over a hydrotreating catalyst, if desired. Jet fuel stream 220 and/or kerosene stream 222 can be sent to the blending zone 170, while diesel stream 225 can be sent to the diesel pool. Alternatively, the kerosene stream and jet fuel streams can be combined.

The atmospheric residue stream 135 can be sent to a vacuum separation zone 230 where it is separated into light vacuum gas oil stream 235 and vacuum gas oil stream 240. Light vacuum gas oil stream 235 is sent to partial hydrocracking zone 245 for partial hydrocracking over hydrocracking catalyst in the presence of hydrogen. The hydrocracked stream 250 is sent to a fluid catalytic cracking (FCC) zone 255. The FCC stream is separated into a $C_3/C_4$ stream 260, FCC naphtha stream 265, FCC cycle oil stream 270, and slurry oil stream 275.

The $C_3/C_4$ stream 260 can be separated into two or more streams, such as a $C_3$ olefin stream and a $C_4$ stream. The $C_3$ olefins and/or a portion of the $C_4$ stream can be sent to an alkylation zone 285 for alkylation. The alkylate stream 290 can be sent to the gasoline pool 162. A portion 293 of the alkylate stream 290 can be sent to the blending zone 170. An $iC_4$ olefin portion 295 of stream 260 can be sent to an etherification zone 300 where it is reacted to form an MTBE stream 305. The MTBE stream 305 can be sent to the gasoline pool 162.

The FCC naphtha stream 265 can be sent to hydrotreating zone 280 where it is hydrotreated over hydrotreating catalyst in the presence of hydrogen. The hydrotreated FCC naphtha stream 307 can be sent to the gasoline pool 162. A portion 310 of the hydrotreated FCC naphtha stream 307 can be sent to the blending zone 170.

In some embodiments, a butane stream 311 can be sent to the blending zone 170.

In some embodiments, a gasoline stream 313 from the gasoline pool 162 can be sent to the blending zone 170.

In some embodiments, the FCC cycle oil stream 270 can be sent to hydrotreating and separation zone 196 to be hydrotreated and separated into hydrotreated kerosene stream 197, hydrotreated diesel stream 198, and hydrotreated jet fuel stream 199. Alternatively, the kerosene and jet fuel streams can be combined.

The slurry oil stream 275 can be used as fuel oil.

In some embodiments, the vacuum gas oil stream 240 can be sent to a coking zone 315 for coking. It can be separated into a coker naphtha stream 320, a coker gas oil stream 325, and a coke stream 330.

The coker naphtha stream 320 can be sent to the naphtha hydrotreating zone 140.

In some embodiments, the coker gas oil stream 325 can be combined with light vacuum gas oil stream 235 and/or atmospheric gas oil stream 130.

The coke stream 330 can be used for fuel in the refineries utilities. Depending on the metal content, it could also be sold for use as fuel for industrial boilers, for use in cement, and for use in synthetic graphite.

In some embodiments, a portion 335 of the atmospheric gas oil stream 130 can be sent to the fluid catalytic cracking zone 255.

In some embodiments, a portion 340 of the atmospheric gas oil stream 130 can be sent to the partial hydrocracking zone 245.

In some embodiments, a portion 345 of the light vacuum gas oil stream 235 can be combined with the atmospheric gas oil stream 130.

The GCI fuel composition is a blend of naphtha and kerosene. The naphtha can comprise one or more of the hydrotreated straight run naphtha stream, hydrotreated straight run heavy naphtha stream 175, the isomerate stream 165, the butane stream 311, the reformate stream 195, the gasoline stream 313, the FCC naphtha stream 310, and the alkylate stream 293. The kerosene can comprise one or more of the kerosene streams 197 and 222, and the jet fuel streams 199 and 220.

As used herein, the term about means within 10% of the value, or within 5%, or within 1%.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the claimed subject matter in any way. Rather, the foregoing detailed description will provide those skilled in the art with a convenient road map for implementing an exemplary embodiment or embodiments. It being understood that various changes may be made in the function and arrangement of elements described in an exemplary embodiment without departing from the scope set forth in the appended claims.

SPECIFIC EMBODIMENTS

While the following is described in conjunction with specific embodiments, it will be understood that this description is intended to illustrate and not limit the scope of the preceding description and the appended claims.

A first embodiment of the invention is a GCI fuel composition comprising a fuel blend having an initial boiling point in a range of about 26° C. to about 38° C. and a final boiling point in a range of about 193° C. to less than 250° C., a density of about 0.72 kg/l to about 0.8 kg/l at 15° C., a research octane number of about 70 to about 85, and a cetane number of less than about 27, the fuel blend comprising a naphtha stream and a kerosene stream. An embodiment of the invention is one, any or all of prior embodiments in this paragraph up through the first embodiment in this paragraph wherein the fuel composition has at least one of: an olefin content of the fuel composition less than about 18 lv %; an aromatic content of the fuel composition less than about 35 lv %; a sulfur content of the fuel composition less than about 10 wt ppm; and a benzene content of the fuel composition less than about 1 lv %. An embodiment of the invention is one, any or all of prior embodiments in this paragraph up through the first embodiment in this paragraph wherein the naphtha stream comprises at least one of a hydrotreated straight run naphtha stream; an isomerate stream; a butane stream; a reformate stream; a gasoline stream; a hydrotreated FCC naphtha stream; and an alkylate stream.

A second embodiment of the invention is a method of making a GCI fuel composition comprising blending a naphtha stream and a kerosene stream to form a fuel blend having an initial boiling point in a range of about 26° C. to about 38° C. and a final boiling point in a range of about 193° C. to less than 250° C., a density of about 0.72 kg/l to about 0.8 kg/l at 15° C., a research octane number of about 70 to about 85, and a cetane number of less than about 27. An embodiment of the invention is one, any or all of prior embodiments in this paragraph up through the second embodiment in this paragraph wherein the naphtha stream comprises at least one of a hydrotreated straight run naphtha stream; an isomerate stream; a butane stream; a reformate stream; a gasoline stream; a hydrotreated FCC naphtha stream; and an alkylate stream. An embodiment of the invention is one, any or all of prior embodiments in this paragraph up through the second embodiment in this paragraph wherein the hydrotreated straight run naphtha stream is formed by hydrotreating a straight run naphtha stream. An embodiment of the invention is one, any or all of prior embodiments in this paragraph up through the second embodiment in this paragraph wherein the isomerate stream is formed by isomerizing at least a portion of the hydrotreated straight run naphtha stream. An embodiment of the invention is one, any or all of prior embodiments in this paragraph up through the second embodiment in this paragraph wherein the reformate stream is formed by reforming at least a portion of the hydrotreated straight run naphtha stream. An embodiment of the invention is one, any or all of prior embodiments in this paragraph up through the second embodiment in this paragraph wherein the gasoline stream comprises a blend of one or more of butane, reformate, isomerate, FCC naphtha, and alkylate. An embodiment of the invention is one, any or all of prior embodiments in this paragraph up through the second embodiment in this paragraph wherein the hydrotreated FCC naphtha stream is formed by fluid catalytically cracking at least one of an atmospheric gas oil stream, a vacuum gas oil stream, a coker gas oil stream, an unconverted oil stream, a light vacuum gas oil stream, or a hydrotreated gas oil stream to form an FCC stream; separating the FCC stream into the FCC naphtha stream and at least one other stream; and hydrotreating the FCC naphtha stream. An embodiment of the invention is one, any or all of prior embodiments in this paragraph up through the second embodiment in this paragraph wherein separating the FCC stream into the FCC naphtha stream and the at least one other stream comprises separating the FCC stream into at least the FCC naphtha stream and a FCC cycle oil stream; and hydrotreating and separating the FCC cycle oil stream into at least a hydrotreated kerosene stream. An embodiment of the invention is one, any or all of prior embodiments in this paragraph up through the second embodiment in this paragraph wherein the alkylate stream is formed by fluid catalytically cracking at least one of an atmospheric gas oil stream, a vacuum gas oil stream, a coker gas oil stream, an unconverted oil stream, a light vacuum gas oil stream, or a hydrotreated gas oil stream to form an FCC stream; separating the FCC stream into a $C_3/C_4$ stream and at least one other stream; separating the $C_3/C_4$ stream into at least a $C_3$ olefin stream and a $C_4$ stream; and alkylating at least a portion of the $C_3$ olefin steam, the $C_4$ stream, or both. An embodiment of the invention is one, any or all of prior embodiments in this paragraph up through the second embodiment in this paragraph wherein the kerosene stream is formed by at least one of separating a hydrocarbon feed stream into a first straight run kerosene stream and at least one other stream, and hydrotreating the first straight run kerosene stream; or separating a hydrocarbon feed stream into a first straight run kerosene/diesel stream and at least one other stream, and hydrotreating and separating the first straight run kerosene/diesel stream into a second straight run kerosene stream, and at least one other stream. An embodiment of the invention is one, any or all of prior embodiments in this paragraph up through the second embodiment in this paragraph wherein the kerosene stream is formed by at least one of hydrocracking a first atmospheric gas oil stream, and separating (and optionally hydrotreating) the hydrocracked atmospheric gas oil stream into a first kerosene stream and at least one other stream; or hydrocracking a second atmospheric gas oil stream, separating the hydrocracked atmospheric gas oil stream into a kerosene/diesel stream and at least one other stream; and separating (and optionally hydrotreating) the kerosene/diesel stream into a second kerosene stream and at least one other stream. An embodiment of the invention is one, any or all of prior embodiments in this paragraph up through the second embodiment in this paragraph wherein separating the hydrocracked atmospheric gas oil stream into the first kerosene stream and the at least one other stream comprises separating the hydrocracked atmospheric gas oil stream into at least the first kerosene stream, a hydrocracker heavy naphtha stream, and an unconverted oil stream. An embodiment of the invention is one, any or all of prior embodiments in this paragraph up through the second embodiment in this paragraph wherein separating the hydrocracked atmospheric gas oil stream into the kerosene/diesel stream and the at least one other stream comprises separating the hydrocracked atmospheric gas oil stream into at least the kerosene/diesel stream, a hydrocracker heavy naphtha stream, and an unconverted oil stream. An embodiment of the invention is one, any or all of prior embodiments in this paragraph up through the second embodiment in this paragraph wherein the first or second atmospheric gas oil stream is formed by separating a hydrocarbon feed stream into the first or second atmospheric gas oil stream and at least one other stream. An embodiment of the invention is one, any or all of prior embodiments in this paragraph up through the second embodiment in this paragraph further comprising separating a hydrocarbon feed stream into at least a straight run naphtha stream, a straight run kerosene/diesel stream, an atmospheric gas oil stream, and an atmospheric residue stream; hydrotreating the straight run naphtha stream to form a hydrotreated straight run naphtha stream; isomerizing the at least a portion of the hydrotreated straight run naphtha stream to form an isomerate stream; reforming at least a portion of the hydrotreated straight run naphtha stream to form a reformate stream; hydrotreating and separating the straight run kerosene/diesel stream into at least a hydrotreated straight run kerosene stream and at least one other stream; hydrocracking at least a portion of the atmospheric gas oil stream to form a hydrocracked stream; separating the hydrocracked stream to form at least a second kerosene/diesel stream, a hydrocracker naphtha stream, and an unconverted oil stream; separating (and optionally hydrotreating) the second kerosene/diesel stream into a second kerosene stream and at least one other stream; vacuum separating the atmospheric residue stream to form at least a light vacuum gas oil stream and a vacuum gas oil stream; optionally partially hydrocracking at least a portion of one or more of the atmospheric gas oil stream, the light vacuum gas oil, or the unconverted oil stream; fluid catalytically cracking at least one of the atmospheric gas oil stream, the vacuum gas oil stream, a coker gas oil stream, the unconverted oil stream, the light vacuum gas oil stream, or a hydrotreated gas oil stream to form an FCC stream; separating the FCC stream into at least a $C_3/C_4$ stream, a FCC naphtha stream, and a FCC cycle oil stream; and hydrotreating the FCC naphtha stream to form a hydrotreated FCC naphtha stream; hydrotreating and separating the FCC cycle oil stream into at least a third hydrotreated kerosene stream; separating the $C_3/C_4$ stream into at least a $C_3$ olefin stream and a $C_4$ stream; and alkylating at least a portion of the $C_3$ olefin steam, the $C_4$ stream, or both to form an alkylate stream; wherein the naphtha stream comprises at least one of the hydrotreated straight run naphtha stream; the isomerate stream; the reformate stream; the hydrotreated FCC naphtha stream; the alkylate stream, a butane stream, and a gasoline stream; and wherein the kerosene stream comprises at least one of the straight run hydrotreated kerosene stream; the second kerosene stream; and the third hydrotreated kerosene stream. An embodiment of the invention is one, any or all of prior embodiments in this paragraph up through the second embodiment in this paragraph further comprising at least one of combining at least a portion of the atmospheric gas oil stream with the light vacuum gas oil stream; and combining the hydrocracker naphtha stream with the hydrotreated straight run naphtha stream. The method of stream 18 further comprising coking the vacuum gas oil stream to form a coked vacuum gas oil stream; separating the coked vacuum gas oil stream into at least a coker naphtha stream, a coker gas oil stream, and a coke stream; and at least one of combining the coker gas oil stream with the light vacuum gas oil stream, or the atmospheric gas oil stream, or both; and combining the coker naphtha stream with the straight run naphtha stream. An embodiment of the invention is one, any or all of prior embodiments in this paragraph up through the second embodiment in this paragraph wherein the GCI fuel composition has at least one of an olefin content of the fuel composition less than about 18 lv %; an aromatic content of the fuel composition less than about 35 lv %; a sulfur content of the fuel composition less than about 10 wt ppm; and a benzene content of the fuel composition less than about 1 lv %.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed:

1. A GCI fuel composition comprising:
   a fuel blend having an initial boiling point in a range of about 26° C. to about 38° C. and a final boiling point in a range of about 193° C. to less than 250° C., a density of about 0.72 kg/l to about 0.8 kg/l at 15° C., a research octane number of about 70 to about 85, and a cetane number of less than about 27, the fuel blend comprising a naphtha stream and a kerosene stream.

2. The fuel composition of claim 1 wherein the fuel composition has at least one of:
   an olefin content of the fuel composition less than about 18 lv %;
   an aromatic content of the fuel composition less than about 35 lv %;
   a sulfur content of the fuel composition less than about 10 wt ppm; and
   a benzene content of the fuel composition less than about 1 lv %.

3. The fuel composition of claim 1:
wherein the naphtha stream comprises at least one of:
a hydrotreated straight run naphtha stream;
an isomerate stream;
a reformate stream;
a gasoline stream;
a hydrotreated FCC naphtha stream; and
an alkylate stream.

4. A method of making a GCI fuel composition comprising:
blending a naphtha stream and a kerosene stream to form a fuel blend having an initial boiling point in a range of about 26° C. to about 38° C. and a final boiling point in a range of about 193° C. to less than 250° C., a density of about 0.72 kg/l to about 0.8 kg/l at 15° C., a research octane number of about 70 to about 85, and a cetane number of less than about 27.

5. The method of claim 4 wherein
wherein the naphtha stream comprises at least one of:
a hydrotreated straight run naphtha stream;
an isomerate stream;
a reformate stream;
a gasoline stream;
a hydrotreated FCC naphtha stream; and
an alkylate stream.

6. The method of claim 4 wherein the naphtha stream comprises a hydrotreated straight run naphtha stream and wherein the hydrotreated straight run naphtha stream is formed by:
hydrotreating a straight run naphtha stream.

7. The method of claim 4 wherein the naphtha stream comprises an isomerate stream and wherein the isomerate stream is formed by:
isomerizing at least a portion of a hydrotreated straight run naphtha stream.

8. The method of claim 4 wherein the naphtha stream comprises a reformate stream and wherein the reformate stream is formed by:
reforming at least a portion of a hydrotreated straight run naphtha stream.

9. The method of claim 4 wherein the naphtha stream comprises a gasoline stream and wherein the gasoline stream comprises a blend of one or more of reformate, isomerate, FCC naphtha, and alkylate.

10. The method of claim 4 wherein the naphtha stream comprises a hydrotreated FCC naphtha stream, and wherein the hydrotreated FCC naphtha stream is formed by:
fluid catalytically cracking at least one of an atmospheric gas oil stream, a heavy vacuum gas oil stream, a coker gas oil stream, an unconverted oil stream, a light vacuum gas oil stream, or a hydrotreated gas oil stream to form an FCC stream;
separating the FCC stream into the FCC naphtha stream and at least one other stream; and
hydrotreating the FCC naphtha stream.

11. The method of claim 10 wherein separating the FCC stream into the FCC naphtha stream and the at least one other stream comprises:
separating the FCC stream into at least the FCC naphtha stream and a FCC cycle oil stream; and
hydrotreating and separating the FCC cycle oil stream into at least a hydrotreated kerosene stream, and wherein the kerosene stream comprises the hydrotreated kerosene stream.

12. The method of claim 4 wherein the naphtha stream comprises an alkylate stream and wherein the alkylate stream is formed by:
fluid catalytically cracking at least one of an atmospheric gas oil stream, a heavy vacuum gas oil stream, a coker gas oil stream, an unconverted oil stream, a light vacuum gas oil stream, or a hydrotreated gas oil stream to form an FCC stream;
separating the FCC stream into a $C_3/C_4$ stream and at least one other stream;
separating the $C_3/C_4$ stream into at least a $C_3$ olefin stream and a $C_4$ stream; and
alkylating at least a portion of the $C_3$ olefin steam, the $C_4$ stream, or both.

13. The method of claim 4 wherein the kerosene stream is formed by at least one of:
separating a hydrocarbon feed stream into a first straight run kerosene stream and at least one other stream, and hydrotreating the first straight run kerosene stream;
or separating a hydrocarbon feed stream into a first straight run kerosene/diesel stream and at least one other stream, and hydrotreating and separating the first straight run kerosene/diesel stream into a second straight run kerosene stream, and at least one other stream.

14. The method of claim 4 wherein the kerosene stream is formed by at least one of:
hydrocracking a first atmospheric gas oil stream, and separating the hydrocracked atmospheric gas oil stream into a first kerosene stream and at least one other stream;
or
hydrocracking a second atmospheric gas oil stream, separating the hydrocracked atmospheric gas oil stream into a kerosene/diesel stream and at least one other stream; and separating the kerosene/diesel stream into a second kerosene stream and at least one other stream.

15. The method of claim 14 wherein separating the hydrocracked atmospheric gas oil stream into the first kerosene stream and the at least one other stream comprises separating the hydrocracked atmospheric gas oil stream into at least the first kerosene stream, a hydrocracker heavy naphtha stream, and an unconverted oil stream.

16. The method of claim 14 wherein separating the hydrocracked atmospheric gas oil stream into the kerosene/diesel stream and the at least one other stream comprises separating the hydrocracked atmospheric gas oil stream into at least the kerosene/diesel stream, a hydrocracker heavy naphtha stream, and an unconverted oil stream.

17. The method of claim 14 wherein the first or second atmospheric gas oil stream is formed by:
separating a hydrocarbon feed stream into the first or second atmospheric gas oil stream and at least one other stream.

18. The method of claim 4 further comprising:
separating a hydrocarbon feed stream into at least a straight run naphtha stream, a straight run kerosene/diesel stream, an atmospheric gas oil stream, and an atmospheric residue stream;
hydrotreating the straight run naphtha stream to form a hydrotreated straight run naphtha stream;
isomerizing the at least a portion of the hydrotreated straight run naphtha stream to form an isomerate stream;
reforming at least a portion of the hydrotreated straight run naphtha stream to form a reformate stream;

hydrotreating and separating the straight run kerosene/diesel stream into at least a hydrotreated straight run kerosene stream and at least one other stream;

hydrocracking at least a portion of the atmospheric gas oil stream to form a hydrocracked stream;

separating the hydrocracked stream to form at least a second kerosene/diesel stream, a hydrocracker naphtha stream, and an unconverted oil stream;

hydrotreating and separating the second kerosene/diesel stream into a second hydrotreated kerosene stream and at least one other stream;

vacuum separating the atmospheric residue stream to form at least a light vacuum gas oil stream and a heavy vacuum gas oil stream;

optionally partially hydrocracking at least a portion of one or more of the atmospheric gas oil stream, the light vacuum gas oil, or the unconverted oil stream;

fluid catalytically cracking at least one of the atmospheric gas oil stream, the heavy vacuum gas oil stream, a coker gas oil stream, the unconverted oil stream, the light vacuum gas oil stream, or a hydrotreated gas oil stream to form an FCC stream;

separating the FCC stream into at least a $C_3/C_4$ stream, a FCC naphtha stream, and a FCC cycle oil stream; and hydrotreating the FCC naphtha stream to form a hydrotreated FCC naphtha stream;

hydrotreating and separating the FCC cycle oil stream into at least a third hydrotreated kerosene stream;

separating the $C_3/C_4$ stream into at least a $C_3$ olefin stream and a $C_4$ stream; and alkylating at least a portion of the $C_3$ olefin steam, the $C_4$ stream, or both to form an alkylate stream;

wherein the naphtha stream comprises at least one of:
the hydrotreated straight run naphtha stream;
the isomerate stream;
the reformate stream;
the hydrotreated FCC naphtha stream; and
the alkylate stream; and wherein the kerosene stream comprises at least one of:
the straight run hydrotreated kerosene stream;
the second hydrotreated kerosene stream; and
the third hydrotreated kerosene stream.

19. The method of claim 18 further comprising at least one of:
combining at least a portion of the atmospheric gas oil stream with the light vacuum gas oil stream; and
combining the hydrocracker naphtha stream with the hydrotreated straight run naphtha stream.

20. The method of stream 18 further comprising:
coking the vacuum gas oil stream to form a coked vacuum gas oil stream;
separating the coked vacuum gas oil stream into at least a coker naphtha stream, a coker gas oil stream, and a coke stream;
and
at least one of:
combining the coker gas oil stream with the light vacuum gas oil stream, or the atmospheric gas oil stream, or both; and
combining the coker naphtha stream with the straight run naphtha stream.

21. The fuel composition of claim 1 wherein the fuel blend further comprises a butane stream.

22. The method of claim 4 wherein the fuel blend further comprises a butane stream.

* * * * *